United States Patent [19]
Tsuda et al.

[11] Patent Number: 5,247,543
[45] Date of Patent: Sep. 21, 1993

[54] CARRIER AQUISITION APPARATUS FOR DIGITAL SATELLITE COMMUNICATION SYSTEM

[75] Inventors: Hiroki Tsuda; Susumu Otani, both of Tokyo, Japan

[73] Assignee: NEC Corporation, Japan

[21] Appl. No.: 745,172

[22] Filed: Aug. 15, 1991

[51] Int. Cl.[5] ............................................. H04L 27/06
[52] U.S. Cl. ......................................... 375/97; 375/79
[58] Field of Search .................... 375/97, 118, 39, 79; 370/104.1; 455/12.1

[56] References Cited

U.S. PATENT DOCUMENTS 4,561,099  12/1985  Hsupi et al. ........................... 375/97
4,879,728  11/1989  Tarallo ................................. 375/97

OTHER PUBLICATIONS

*OdB Eb/No Burst Mode SCPC Modem with High Coding Gain FEC*, IEEE, pp. 56.41–56.45, 1986.
*Phaselock Techniques*, Floyd M. Gardner, Ph.D., Second Edition, John Wiley & Sons, 1979.
*Digital Communication*, Edward A. Lee/David G. Messerschmitt, Kluwer Academic Publishers, 1988.

*Primary Examiner*—Curtis Kuntz
*Assistant Examiner*—T. Ghebretinsae
*Attorney, Agent, or Firm*—Ostrolenk, Faber, Gerb & Soffen

[57] ABSTRACT

A time division PLL is composed of a complex multiplier (1), a phase difference detector (2), a low-pass filter (3), an adder (4) and a digital VCO (5). A D.C. value indicating the recovered carrier component of a receive burst is obtained by a squaring circuit (9) from a baseband signal, which is the output of the complex multiplier (1). The time division PLL operates as a PLL having frequency different lead-in ranges on a time division basis, differing between the period in which no burst has been received yet and the period in which the former part of the carrier recovery section of the receive burst is being received. It operates, from the latter part of the carrier recovery section until the completion of data reception, as a PLL having the frequency pull-in range in which the greatest D.C. value was outputted during the time division operation.

4 Claims, 6 Drawing Sheets

CARRIER AQUISITION APPARATUS FOR DIGITAL SATELLITE COMMUNICATION SYSTEM

BACKGROUND OF THE INVENTION

The present invention relates to a carrier aquisition apparatus for recovering the carrier from a received burst in a digital satellite communication system, and more particularly to a carrier recovery apparatus for recovering the carrier at high speed from the receive burst having undergone a significant frequency offset relative to the transmission speed of digital signals.

In a burst mode digital satellite communication system, it is necessary to promptly synchronize the reference carrier with the carrier component of the receive burst transmitted from another ground station via a satellite, and recover data from modulated digital data, for instance phase shift keying modulated data, contained in the received burst. For this reason, there are arranged in the received burst, preceding the transmit data section, a carrier recovery sequence for recovering the carrier, a bit timing recovery sequence for recovering the bit timing and a unique word for indicating the beginning of the transmitted data. In order to correctly recover the unique word and the data sequence from the receive burst, it is necessary not only to correctly extract a bit timing signal from the bit timing recovery sequence but also to promptly synchronize the reference carrier with the frequency and phase of this carrier recovery sequence while the carrier recovery sequence is being received.

A phase-locked loop (PLL) is used for this carrier recovery. For examples of this PLL, reference may be made to Namiki, Otani and Yasuda, "0 dB Eb/No Burst Mode SCPC Modem with High Coding Gain FEC" in the 1986 INTERNATIONAL CONFERENCE ON COMMUNICATION, and F. M. Gardner, *Phaselock Techniques* (1979, John Willey & Sons, Inc.) among others.

In a communication process in which signals are transmitted via an artificial satellite, a frequency offset occurs from the remaining effect of automatic frequency control (AFC) or the drift of the oscillator on the transmitting side. The maximum frequency offset can be typically in a usual satellite communication system. In low modulation rate burst signal transmission, however, the carrier offset becomes a serious problem for carrier recovery, as will be described below.

Here is supposed a case where a first order PLL is used which comprises a phase detector, a voltage controlled oscillator, and a loop filter whose transfer function $F(s)=1$. This first order PLL is characteristic in that the acquisition time is short even when the carrier power-to-noise ratio is low. Then suppose a case in which there is a frequency difference $\Delta w$ ($=2\pi\Delta f$) between the carrier component of the received burst and the reference carrier. For the first order phase lock loop with a sinusoidal characteristic phase detector, the equation representing the response of a phase error $\theta_e(t)$ between the input carrier phase and the reference carrier phase is:

$$\frac{d\theta_e(t)}{dt} = \Delta w - K \sin \theta_e(t) \quad (1)$$

where K is the loop gain. In order to achieve a steady state of $$\left( \frac{d\theta_e(t)}{dt} = 0 \right).$$

In order to achieve phase lock, the relationship of $$\left| \frac{\Delta w}{K} \right| = \left| \frac{2\pi\Delta f}{K} \right| \leq 1 \quad (2)$$

is required as derived from Equation (1). Therefore, if the frequency offset $\Delta f$ exceeds $$\frac{K}{2\pi},$$

the PLL will become unable to be phase-synchronized with the input signal, making it difficult for the carrier to be recovered. Although the permissible frequency deviation $\Delta w$ can be increased if the loop gain K is enlarged, a greater K would invite an increase in the phase jitter of the reference carrier, and therefore there is a certain limit to the enlargement of K. Accordingly, a wide frequency range for carrier acquisition cannot be covered by a single PLL. If the loop gain of the first order PLL is made $0.1 \cdot 2\pi f_b$ when the modulation rate is $f_b$ (baud), the frequency offset which permits pull-in by a PLL will be $|\Delta f| \leq 0.1 f_b$. Then, in low rate transmission of $f_b = 1200$ to 9600 (baud), the upper limit of the frequency offset synchronizable by a phase synchronizing circuit will be 120 to 960 Hz. Therefore, it would be difficult to recover, with a single phase synchronizing circuit, the carrier from a received burst having a frequency offset of as great as 2 kHz.

A conceivable solution to this problem is parallel processing, i.e. a method using a plurality of demodulators having a different pull-in range from each other and obtaining demodulated signals from the demodulator having detected the greatest carrier component. This method, however, requires large hardware, because of the need for a plurality of demodulators, and accordingly is uneconomical.

SUMMARY OF THE INVENTION

An object of the present invention, therefore, is to provide a carrier acquisition apparatus capable of promptly recovering the carrier from the received burst without requiring large hardware even in burst transmission in a satellite communication system in which exists a frequency offset of a magnitude surpassing the data modulation rate.

According to the invention, there is provided an apparatus for carrier recovery from receive burst signals in a digital satellite communication system, comprising:

demodulating means for demodulating said receive burst signals on the basis of the recovered carrier and supplying demodulated signals;

phase difference detecting means for detecting the phase difference between the carrier component of said receive burst signals and said recovered carrier on the basis of said demodulated signals, and supplying a phase control signal;

frequency control signal generating means for generating a frequency control signal on the basis of a control signal;

recovered carrier generating means for generating said recovered carrier on the basis of said phase control signal and said frequency control signal, this recovered carrier generating means having built-in memory means for temporarily storing its internal values at addresses indicated by the control signal immediately before said control signal varies and, immediately after said control signal varies, setting the values stored at the address indicated by the control signal to the internal values of this recovered carrier generating means;

D.C. signal generating means for calculating the D.C. values of said demodulated signals;

carrier component detecting means for detecting the value of the control signal corresponding to the greatest of the D.C. values, one supplied for each value of said control signal, as the optimal control signal; and control means for circulatively generating the values of said control signal in part of the period of the carrier recovery section of said burst and when no burst has been received yet, and supplying said optimal control signal as said control signal during the rest of the carrier recovery section of said burst and until the completion of burst data reception.

BRIEF DESCRIPTION OF THE DRAWINGS

FIG. 2 is a timing chart roughly illustrating the operations of the configuration of FIG. 1, wherein:

DESCRIPTION OF THE PREFERRED EMBODIMENT

Figure 1:
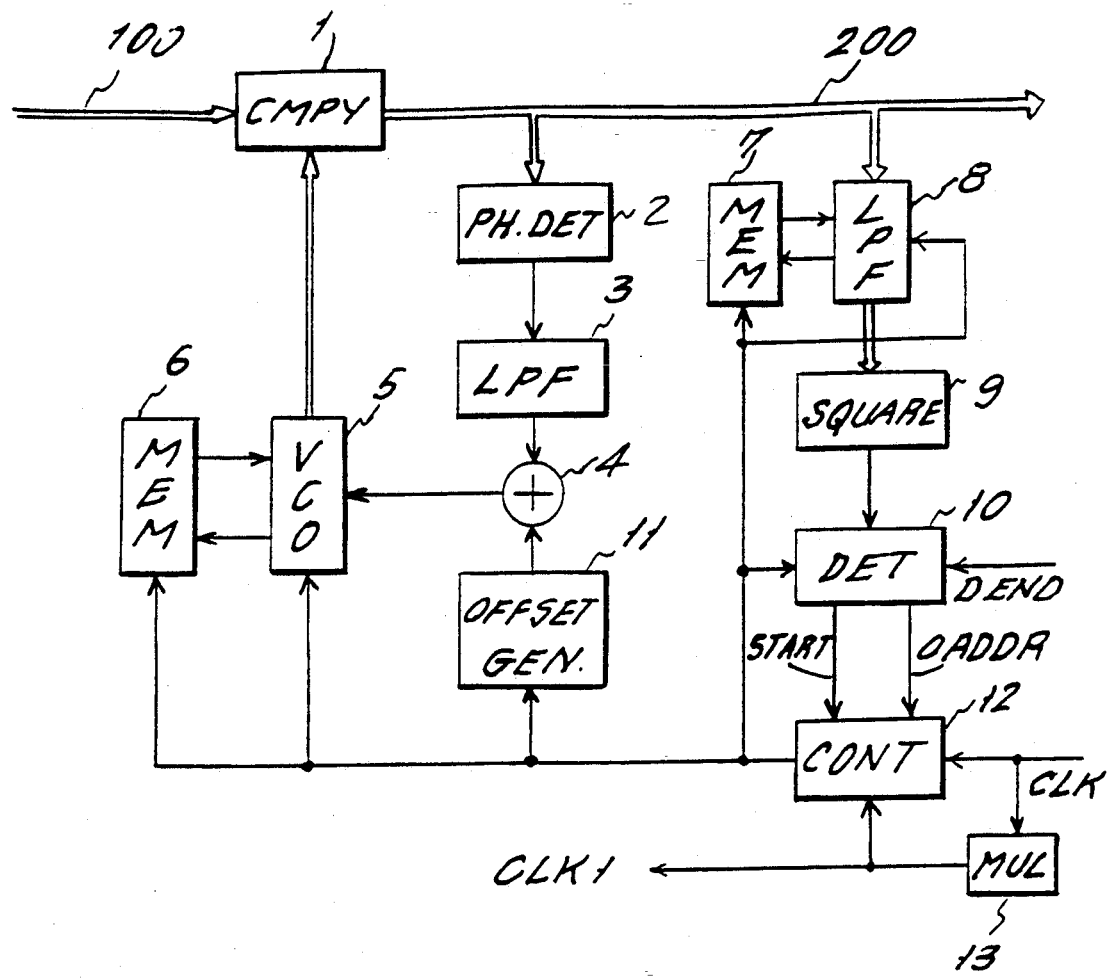
FIG. 1 is a block diagram illustrating the configuration of a preferred embodiment of the present invention.

FIG. 1 is a block diagram illustrating the configuration of a preferred embodiment of the present invention. This embodiment is provided with a complex multiplier 1 for detecting a quasi-coherent detected receive burst signal 100 with a reference carrier supplied from a digital VCO 5 and supplying an in-phase signal I, which is the in-phase component of a demodulated signal 200, and an quadrature signal Q, which is the quadrature component of the demodulated signal 200; a phase difference detector 2 which is supplied with the demodulated signal 200 and obtains the phase difference between the carrier component of the receive burst signal 100 and the reference carrier supplied from the digital VCO 5; and a low-pass filter for filtering this phase difference to obtain a phase control signal.

The preferred embodiment of the invention is also provided with an offset generator 11 for supplying a frequency control signal on the basis of an address signal (ADDR) supplied from a control circuit 12; an adder 4 for adding the phase control signal and the frequency control signal to supply a frequency-phase control signal; the digital VCO 5 for supplying the in-phase component and the orthogonal component of the reference carrier on the basis of the frequency-phase control signal; and a memory 6 for storing the internal value of the digital VCO 5 or setting the internal value on the basis of a control signal from the control circuit 12.

The embodiment is further provided with a low-pass filter 8 for filtering the in-phase signal I and the quadrature signal Q, and supplying a filtered in-phase signal I' and a filtered quadrature signal Q'; a memory 7 for storing the internal value of the low-pass filter 8 or setting a stored value in the low-pass filter 8 on the basis of a control signal from the control circuit 12; a square-sum circuit 9 for calculating a sum $(I'^2+Q'^2)$ of the squares of the filtered in-phase signal I' and the filtered orthogonal signal Q', and supplying the sum as a calculated value indicating the magnitude of the digital VCO output frequency component contained in the receive burst; and an unmodulated carrier detecting circuit 10 which is supplied with the calculated value and an address corresponding to this calculated value, holds the address at which this calculated value reaches its maximum (OADDR), and supplies a control signal START indicating the end of data reception and the start of the reception of the carrier recovery section of the receive burst.

Still further, the embodiment of the invention is provided with a control circuit for generating control signals including the control signal ADDR on the basis of the control signal START supplied from a squaring circuit 9, a data clock and an operational clock, both to be explained later, and controlling the operations of the digital VCO 5, the memory 6, the offset generator 11 and the low-pass filter 8.

In addition to the foregoing, the embodiment is provided with a multiplier 13 for multiplying the clock of the data in the receive burst, i.e. data clock (CLK), and generating operational clock (CLK1) for operating the digital VCO 5, the low-pass filter 8 and the control circuit 12 etc.

The configuration of the preferred embodiment of the present invention illustrated in FIG. 1 has been summarized above. Before describing internal embodiments of elements in FIG. 1, the principle of the invention will be explained below with reference to FIGS. 2A through 2F.

Figure 2A:
FIG. 2A shows the composition of the receive burst.
Figure 2B:
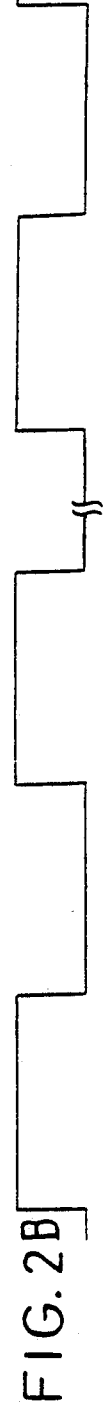
FIG. 2B, the data clock which is the timing signal of data in the receive burst.
Figure 2C:
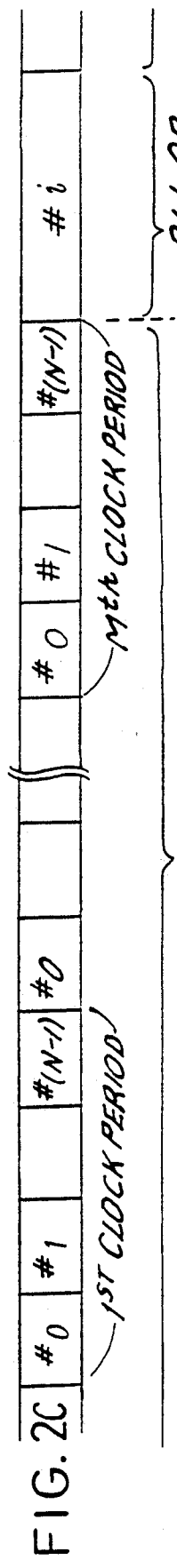
FIG. 2C, clock periods and split periods in the time division PLL processing according to the invention.
Figure 2D:
FIG. 2D, operational clock.
Figure 2E:
FIG. 2E, a data reception end (DEND) signal.

FIG. 2A shows the composition of the receive burst; FIG. 2B, the data clock; FIG. 2C, the control signal ADDR; FIG. 2D, the aforementioned operational clock (CLK1); FIG. 2E, the DEND signal indicating the completion of the demodulation of the receive burst; and FIG. 2F, the control signal START.

As illustrated in FIGS. 2A to 2C, according to the present invention, the period of receiving the carrier recovery section of the receive burst is split into a time division phase locked loop (PLL) operation period (TD.PLL.OP. in FIG. 2C) and a conventional PLL operation period (PLL.OP. in FIG. 2C), both to be explained later. The period in which the bit timing recovery sequence, unique word and data section are entered is the conventional PLL operation period, and time division PLL operation takes place in the period after the completion of data reception, during which no burst is received.

The time division PLL operation period, while the carrier recovery section of the burst is received, is divided into M clock periods each of which is either one data clock or one cycle of modulated clock (the 1st through Mth clock periods in FIG. 2C), and each clock period is further divided into N subperiods #0, #1, ..., #N−1.

Now, the digital VCO is so set as to make the frequency lead-in range of the PLL in the subperiod #0 $-N/2\Delta f + f_0 \leq (-N/2+1)\Delta f + f_0$, where $+N/2 \Delta f$ is the maximum frequency offset, which may be +2 kHz for instance, and $f_0$ is the carrier frequency at a frequency offset of 0 Hz. It also is so set as to make the frequency lead-in range in the subperiod #i $(-N/2+i)\Delta f + f_0 \leq f \leq (-N/2+i+1)\Delta f + f_0$, and that in the subperiod #(N−1) $(N/2-1)\Delta f \leq f \leq N/2\Delta f + f_0$, with the result that a maximum frequency offset range of $-N/2\Delta f + f_0 \leq f \leq N/2\Delta f + f_0$, i.e. $|f - f_0| \leq 2$ kHz, is covered in the subperiods #0 through #(N−1).

When a burst signal having a frequency offset is supplied to the carrier acquisition apparatus of the invention, the closer the subperiod to which a frequency pull-in range is allocated to the carrier frequency of the burst, the sooner the carrier phase synchronization is performed. Whereas a D.C. component is generated when the carrier recovery section of the receive burst is orthogonally detected with the output of the VCO, the magnitude of this D.C. component reaches its maximum when the unmodulated carrier of the carrier recovery section in the receive burst and the recovered carrier supplied from the VCO become synchronized in phase.

According to the invention, the magnitude of this D.C. component is monitored for each subperiod, and the subperiod in which the D.C. component takes on its greatest magnitude (the optimum subperiod) is detected in the Mth clock period, i.e. the final clock period of the time division PLL operation period. Further according to the invention, the frequency pull-in range of the VCO is set to that of optimum subperiod upon entrance into the convention PLL operation pull-in range, and the process shifts to the conventional PLL operation. In this way, there can be realized a carrier acquisition apparatus which promptly establishes carrier synchronization even for the carrier of a burst signal of a large frequency offset and a low bit rate without having to enlarge the hardware dimensions extremely.

Now will be described, referring back to FIG. 1, the operation of the preferred embodiment of the present invention.

A quasi-coherently detected receive burst is multiplied in the complex multiplier 1 by the in-phase component and the quadrature component of a recovered carrier supplied from the digital VCO 5 to give the in-phase component I and the quadrature component Q of a demodulated signal 200, respectively. The demodulated signal is supplied to the phase difference detector 2 and the low-pass filter 8.

The phase difference detector 2 detects the phase difference between the reference carrier supplied from the digital VCO 5 and the carrier component of the receive burst 100 on the basis of the in-phase signal I and the quadrature signal Q. For the configuration of this phase difference detector, reference may be made to, for instance, F. M. Gardner, *Phaselock Techniques* (1979, John Willey & Sons, Inc.), FIG. 11.9 and elsewhere.

The phase difference detected by the phase difference detector 2 is filtered by the low-pass filter 3 to give a phase control signal, which is added to a frequency control signal supplied from the offset generator 11, and the resultant frequency-phase control signal is supplied to the digital VCO 5.

In the offset generator 11, composed of a read only memory (ROM) for instance, is written in advance the frequency control signal corresponding to a subperiod-indicating address ADDR (#0 to #N−1) supplied from the control circuit 12. This ROM outputs a stored value as the frequency control signal corresponding to the address ADDR supplied from the control circuit 12 (this address indicates a subperiod), and supplies the frequency control signal to the adder 4.

The digital VCO 5 generates the in-phase component and the quadrature component of the reference carrier on the basis of the frequency-phase control signal, and supplies them to the complex multiplier 1. The internal configuration and operation of this digital VCO 5, which will be described in more detail below, differ from those of a conventional digital VCO in that the internal value is updated at the beginning time of each of the subperiods #0 through #N−1 to the internal value at the ending time of the same subperiod of the preceding cycle (this value is stored in the memory 6), so that continuous operation apparently takes place at the same subperiod. Thus the digital VCO 5, based on a value stored from the memory 6 at the beginning time of each subperiod, outputs the in-phase component and the orthogonal component of the recovered carrier, within the frequency pull-in range assigned to each subperiod, in accordance with the frequency-phase control signal entered from the adder circuit 5.

In the aforementioned conventional PLL operation period, at the beginning time of the period, the internal value of the digital VCO is set, in accordance with a control signal from the control circuit 12, to the internal value at the ending time of the period determined to be the aforementioned optimum subperiod in the Mth clock period. The offset generator 11, supplied with an address indicating this optimum subperiod from the control circuit 12, generates a frequency control signal in the optimum subperiod. In this way, this embodiment of the invention performs operation, after the completion of time division PLL operation and until that of the reception end of the data section in the receive burst, in the conventional PLL operation period.

As described above, the loop consisting of the complex multiplier 1, phase difference detector 2, low-pass filter 3, adder 4 and digital VCO 5 performs time division PLL and conventional PLL operations in accordance with the control signal from the control circuit 12.

Meanwhile, the in-phase signal I and the quadrature signal Q outputted from the complex multiplier 1 are supplied to the low-pass filter 8, cleared of their respective high frequency components, and converted into the filtered in-phase signal I' and the filtered quadrature signal Q'. They are supplied to the squaring sum circuit 9, which calculates the sum of squares $(I'^2 + Q'^2)$. As is well known to those skilled in the art, this calculated value serves as the D.C. value to indicate the magnitude of the digital VCO's output frequency component in the carrier of the carrier recovery section of the burst. This calculated value is almost zero except in the carrier recovery section of the receive burst or in a period in which no burst is received.

The unmodulated carrier detecting circuit 10 is supplied with the aforementioned calculated value and the data reception end signal (DEND). The signal (DEND) indicates the completion of the operation to receive the data section of the received burst, and is supplied from a receive data processing circuit (not shown) arranged downstream in this preferred embodiment. The internal configuration of this unmodulated carrier detecting circuit 10 will be described later.

Figure 2F:
FIG. 2F, a control signal START.

Upon arrival of the DEND signal (see FIG. 2E), the unmodulated carrier detecting circuit 10 supplies the control circuit 12 with the control signal START to instruct ending of the conventional PLL operation then under way and shifting to the time division PLL operation (see FIG. 2F). When the output of the squaring circuit 9 exceeds a prescribed threshold for the first time during the period of time division PLL operation, the unmodulated carrier detecting circuit 10 reverses the polarity of the aforementioned control signal START and notifies the control circuit 12 that the time division PLL operation should be ended M clock periods later. What is to be noted here is that the first surpassing of the prescribed value by the output of the squaring circuit 9 during the period of time division PLL operation means that the leading part of the carrier recovery section of the receive burst has been received. The operations according to the present invention assume this detection time to be the time of burst reception.

The unmodulated carrier detecting circuit 10 is supplied with calculated values successively coming from the squaring circuit 9, i.e. D.C. values indicating the magnitudes of components in the receive burst synchronized with the recovered carrier. The unmodulated carrier detecting circuit 10 holds the address indicating the subperiod at which the D.C. value fed after the completion of the data reception of the previous receive burst was at its greatest among the subperiods of time division PLL operation, i.e. the optimum address (OADDR). Thus the optimum address is held within the unmodulated carrier detecting circuit 10 at the ending time of time division PLL operation, i.e. that of the Mth clock period and of the final subperiod in FIG. 2C, and this optimum address (OADDR) is supplied to the control circuit 12.

The control circuit 12 starts time division PLL operation upon transition of the control signal START (FIG. 2F), supplied from the unmodulated carrier detecting circuit 10, to a low level. It generates control signals to control the operations of the digital VCO 5, memories 6 and 7, low-pass filter 8 and unmodulated carrier detecting circuit 10 on the basis of the data clock CLK (see FIG. 2B) from a data clock regenerating circuit arranged downstream in this embodiment and the operational clock CLK1 (see FIG. 2D) generated by multiplying the data clock with the multiplier 13.

When the control signal and the START signal shown in FIG. 2F come down to a low level, the control circuit 12 successively generates control signals ADDR to designate subperiods #0, #1, ..., #(N−1) on the basis of the data clock CLK and the operational clock CLK1 to cause the digital VCO 5, offset generator 11 and low-pass filter 8 to perform time division operation for each subperiod. Thus the offset generator 11 is caused to output a frequency control signal corresponding to the pertinent subperiod, and the digital VCO 5 to oscillate in the frequency pull-in range allocated for the subperiod. The control circuit 12 further causes the internal values of the digital VCO 5 and of the low-pass filter 8 to be stored in the memories 6 and 7, respectively, at the final operational clock time of each subperiod. This operation, as will be explained later, is accomplished by raising a control signal R/W to a high level.

In addition, the control circuit 12 causes the internal values of the digital VCO 5 and of the low-pass filter 8 at the ending time of the same subperiod in the immediately preceding clock period, which are stored in the memories 6 and 7, to be stored in the digital VCO 5 and the low-pass filter 8 at the beginning time of each subperiod. In this way, the initial value of each circuit at the first operational clock (CLK1) time of each subperiod is determined so that the time division operation can be smoothly performed.

When the control signal rises to the high level, i.e. when the carrier recovery section of the receive burst is detected, the control circuit 12 ends the time division PLL operation M clock periods later. The operation of the control circuit 12 during these M clock periods is the same as that during the period when no burst is received as yet.

At the end of the final subperiod of the time division PLL operation, i.e. at the end of the #(N−1) subperiod of the Mth clock period in FIG. 2C, the control circuit 12 sends the address signal (OADDR) indicating the optimum subperiod supplied from the unmodulated carrier detecting circuit 10 to the offset generator 11 to cause it to supply the frequency control signal corresponding to the optimum subperiod. This address signal is also sent to the memories 6 and 7, and the internal values of the digital VCO 5 and the low-pass filter 8 at the final operational clock time in the Mth clock period are set in the digital VCO 5 and the low-pass filter 8, respectively. After that, conventional PLL operation takes place within the frequency pull-in range corresponding to the address OADDR until the reception of all the data in the data section of the receive burst is completed, i.e. until the aforementioned DEND signal is supplied to the unmodulated carrier detecting circuit 10.

What should be noted here is that, when no burst has been received as yet and at the time of receiving the carrier recovery section of the burst, the bit timing recovery section of the receive burst has not yet been received, so that the data clock (CLK) supplied from the data clock regenerating circuit (not shown) arranged downstream in this embodiment is not in phase-synchronism with the data timing signal of the data section in the burst. However, as the output of the data clock regenerating circuit, though no in synchronism with the data timing signal of the data section in the burst, is freely oscillating at a frequency very close to its frequency, accordingly there is no obstacle to practical use.

Although the foregoing description assumed that a quasi-coherently detected receive burst was entered, the present invention can be similarly executed even if a receive burst which is frequency-converted into the IF band is entered.

Figure 3:
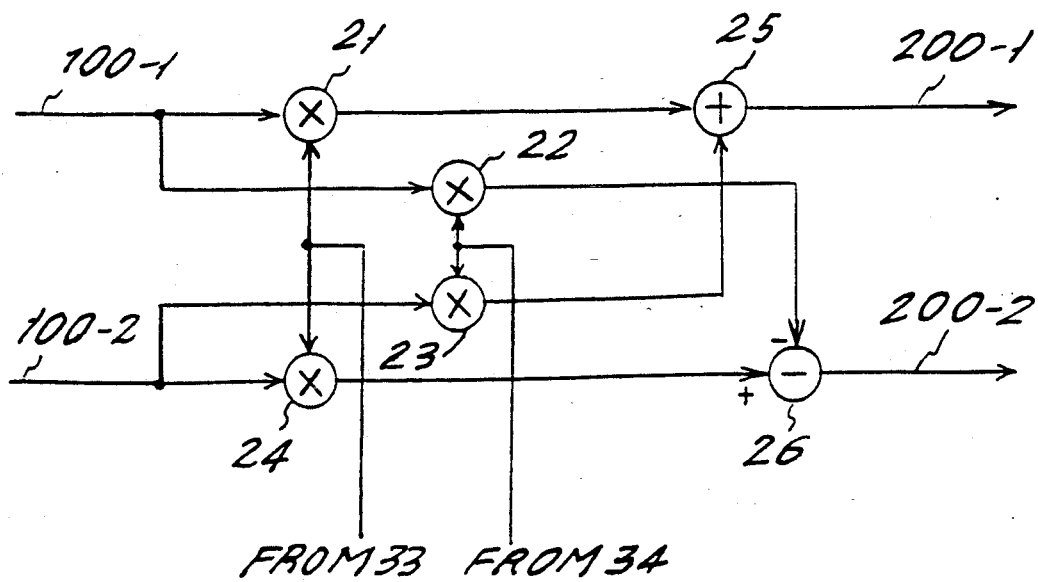
FIG. 3 is a block diagram illustrating the configuration of a complex multiplier.

FIG. 3 illustrates the configuration of the complex multiplier 1. The in-phase component x(t) of the quasi-synchronously detected receive burst is supplied to multipliers 21 and 22 via a signal line 100-1, while the quadrature component y(t) of the quasi-coherently detected receive burst is supplied to multipliers 23 and 24 via a signal line 100-1.

Meanwhile, the multipliers 21 and 24 are supplied with the in-phase component $\cos 2\pi \, ft$ of the recovered carrier, while the multipliers 22 and 23 are supplied with the quadrature component $\sin 2\pi \, ft$ of the recovered carrier. The outputs of the multipliers 21 and 23 are added by an adder 25 to give $x(t) \cos 2\pi \, ft + y(t) \sin 2\pi \, ft$, which represents the in-phase component I of the demodulated signal and is outputted to a signal line 200-1.

A subtracter 26 subtracts the output of the multiplier 22 from that of the multiplier 24, resulting in $-x(t) \sin 2\pi \, ft + y(t) \cos 2\pi \, ft$, which represents the quadrature component Q of the demodulated signal and is outputted to a signal line 200-2.

Figure 4A:
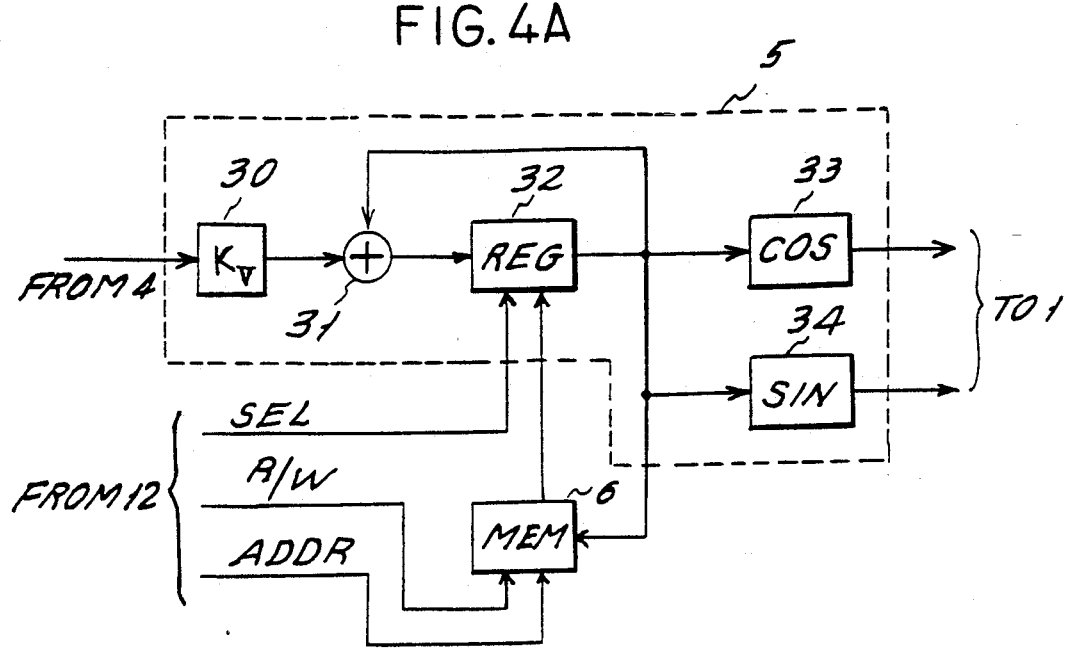
FIG. 4A is a block diagram illustrating a digital VCO circuit and a memory accompanying it.

Next will be described the configurations and operations of the VCO 5 and the memory 6 with reference to FIGS. 4A and 4B. The frequency-phase control signal supplied from the adder 4 is multiplied by $K_V$ in a multiplier 30, where $K_V$ is a constant which determines the modulation sensitivity of the VCO. The $K_V$-multiplied frequency-phase control signal is accumulated by an accumulator consisting of an adder 31 and a register-equipped multiplexer (REG) 32. The result of accumulation is supplied as an address to read only memories (ROM s) 33 and 34.

In the ROM's 33 and 34 are stored a one-cycle equivalent each of cosine and sine waves, respectively. When the address is fed to the ROM's, the cosine wave is outputted from the ROM 33, and the sine wave, which has a phase lag of $\pi/2$ from the cosine wave, from the ROM 34, both being fed to the complex multiplier 1 of FIG. 1. The hitherto described are the operations which take place in each subperiod and when the time division PLL has shifted to a single-channel operation after the completion of time division operation. At this time, a control signal SEL from the control circuit 12 of FIG. 1 so effects control as to make the register-equipped multiplexer 32 take in the output of the adder 31.

Now will be described the operations at the end and beginning of each subperiod with reference to the timing chart of FIG. 4B. To the memory 6 are supplied an address signal ADDR indicating the subperiod (FIG. 4B(a)) and a R/W signal which has entered into a write instructing state (high level) (FIG. 4B(c)), and the value of the register-equipped multiplexer 32 is written into the memory 6.

At the beginning time of each subperiod, the R/W signal is in a read state (low level), and the value of the register-equipped multiplexer 32 at the ending time of the same subperiod in the preceding cycle is outputted from the memory 6. At this beginning point of a subperiod, the control signal SEL from the control circuit 12 is at a high level, and the register-equipped multiplexer 32 takes in the value outputted from the memory 6. In this way, the initial phase of the VCO 5 at the beginning point of each subperiod is determined.

At the time when the operation as time division PLL has ended, i.e. at the first operational clock time of conventional PLL operation, the address indicating the optimum subperiod (OADDR) is fed from the control circuit 12 to the memory 6, which outputs the value of the register-equipped multiplexer 32 at the final operational clock time of the optimum subperiod of the final cycle of time division PLL. At this operational clock time of conventional PLL operation, the control signal SEL from the control circuit 12 again rises to the high level, and the output of the memory 6 is taken in by the register-equipped multiplexer 32. After that, the control signal SEL again falls to the low level, and the register-equipped multiplexer 32 again takes in the output of the adder 31. The value of the control signal ADDR is fixed at the address indicating the optimum subperiod. In this manner, the PLL shifts to the operation of the VCO similar to conventional PLL operation.

Figure 5:
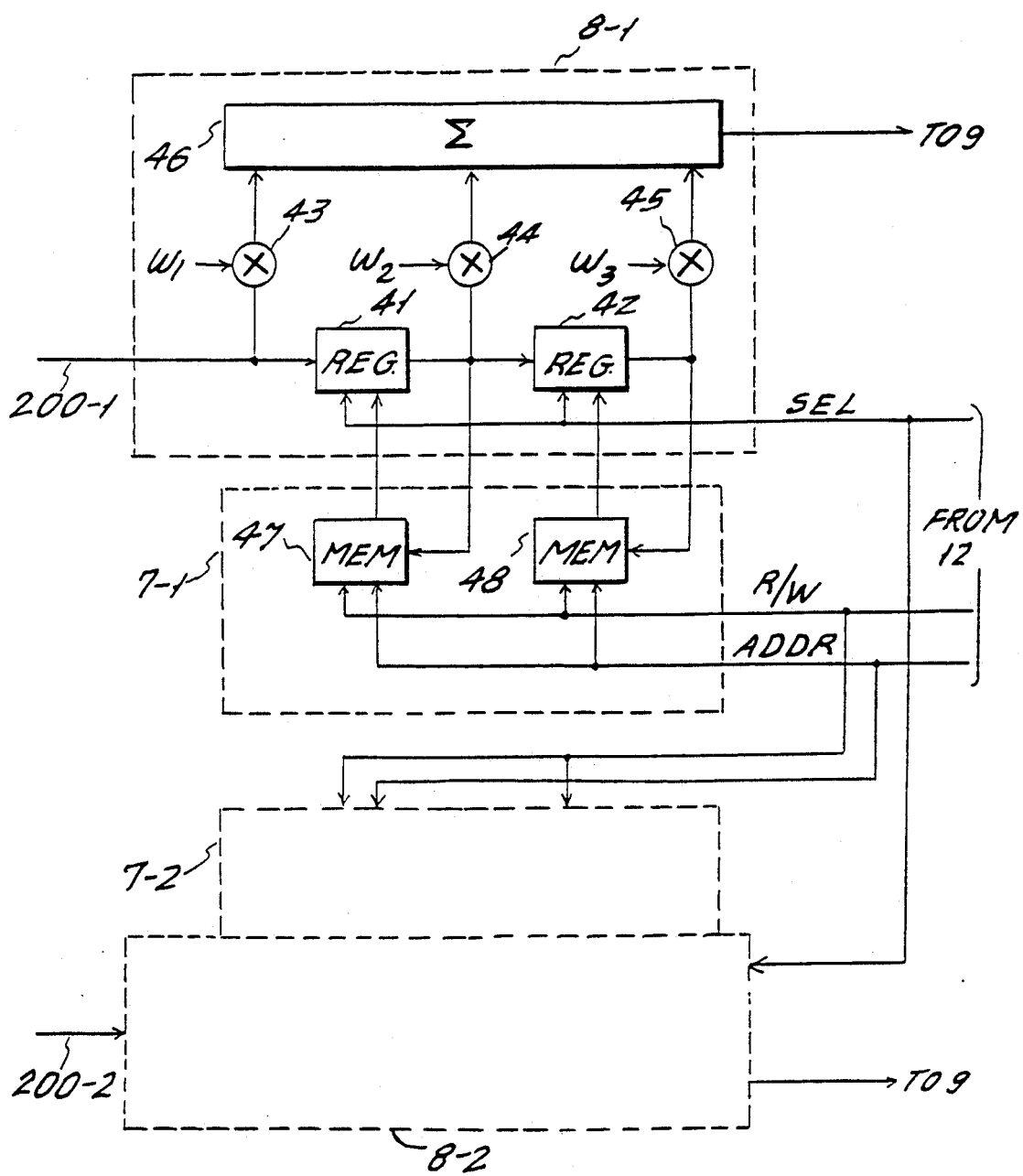
FIG. 5 is a block diagram illustrating the configuration of a low-pass filter.

Next will be described the configurations and operations of the low-pass filter 8 and the memory 7 with reference to FIG. 5. As shown in FIG. 5, the low-pass filter 8 is composed of an in-phase signal filter 8-1, to which an in-phase signal is supplied, and an quadrature signal filter 8-2. The in-phase signal filter 8-1 and the quadrature signal filter 8-2 are supplied with the in-phase component I and the quadrature component Q of the demodulated signal, outputted from the complex multiplier 1 of FIG. 1, via signal lines 200-1 and 200-2, respectively. The memory 7 is divided into memory 7-1 and 7-2 respectively matched with the in-phase signal filter 8-1 and the quadrature signal filter 8-2. Since the configurations and operations of the in-phase signal low-pass filter 8-1 and the memory 7-1 are respectively the same as those of the quadrature signal low-pass filter 8-2 and the memory 7-2, only the former will be described here.

FIG. 5 illustrates an example in which a transversal filter is used as the in-phase signal low-pass filter 8-1, which differs from a conventional transversal filter in that register-equipped multiplexers 41 and 42 are used as delay elements. Whereas the in-phase signal low-pass filter 8-1 is supplied with a control signal SEL, and the memory 7-1, with a control signal ADDR and a control signal R/W, these signals are the same as the signals to which respectively the same symbols are assigned in FIG. 4.

First, while both the control signal SEL and the control signal R/W are at the low level, i.e. during each subperiod of time division PLL operation except the beginning and ending times, or after time division PLL has ended and shifting to convention PLL operation has taken place, the register-equipped multiplexer 41 takes in the in-phase signal I from the signal line 200-1, and the register-equipped multiplexer 42 takes in the output value of the register-equipped multiplexer 41, the in-phase signal low-pass filter 8-1 operates in the same way as a conventional transversal filter. Thus a signal on the signal line 200-1, the output of the register-equipped multiplexer 41 and that of the register-equipped multiplexer 42 are multiplied by weight coefficient w1, w2 and w3 in multipliers 43, 44 and 45, respectively, and the outputs of the multipliers 43, 44 and 45 are added by an adder 46, the sum being supplied as the filtered in-phase signal.

Next will be described the operation which takes place when the control signal SEL from the control circuit 12 is at the low level and the control signal R/W is at the high level, i.e. at the ending time of each subperiod of time division PLL operation. As the control signal R/W is at the high level, memory units 47 and 48 are in the write mode, and the values of the register-equipped multiplexers 41 and 42 are written into the memory units 47 and 48 at the address indicated by the control signal ADDR. These written values are read out at the beginning time of the same subperiod of the next data clock period.

Now will be described the operation taking place when the control signal SEL from the control circuit 12 is at the high level and the control signal R/W is at the low level, i.e. at the beginning time of each subperiod of time division PLL operation. At this time, as the memory units 47 and 48 are in the read mode and the address indicating the subperiod is given as the control signal ADDR, the values of the register-equipped multiplexers 41 and 42 of one cycle before, i.e. at the ending time of the same subperiod one modulation clock time before, are supplied from the memory units 47 and 48. At this time, as the control signal SEL is at the high level, the register-equipped multiplexers 41 and 42 take in the output values of the memory units 47 and 48, respectively. In this way, in spite of the time division operation of the in-phase signal filter, continuous operation is taking place with respect to the same subperiod alone.

At the time immediately after the end of time division PLL operation, the control signal SEL again rises to the high level. At this time, as the address indicating the subperiod judged to be the optimum in the final period of time division PLL operation is supplied as the control signal ADDR, the values of the register-equipped multiplexers 41 and 42 are read out of the memory units 47 and 48, respectively, and taken into the register-equipped multiplexers 41 and 42. Immediately after this, the control signal SEL again falls to the low level, and the control signal ADDR is fixed to the value indicating the optimum split time, with the filter shifting to conventional PLL operation.

Although the foregoing description, for the sake of simplicity, supposed a case in which three-tapped transversal filters were used as the low-pass filters 8-1 and 8-2, they are not limited to three-tapped filters.

Figure 6:
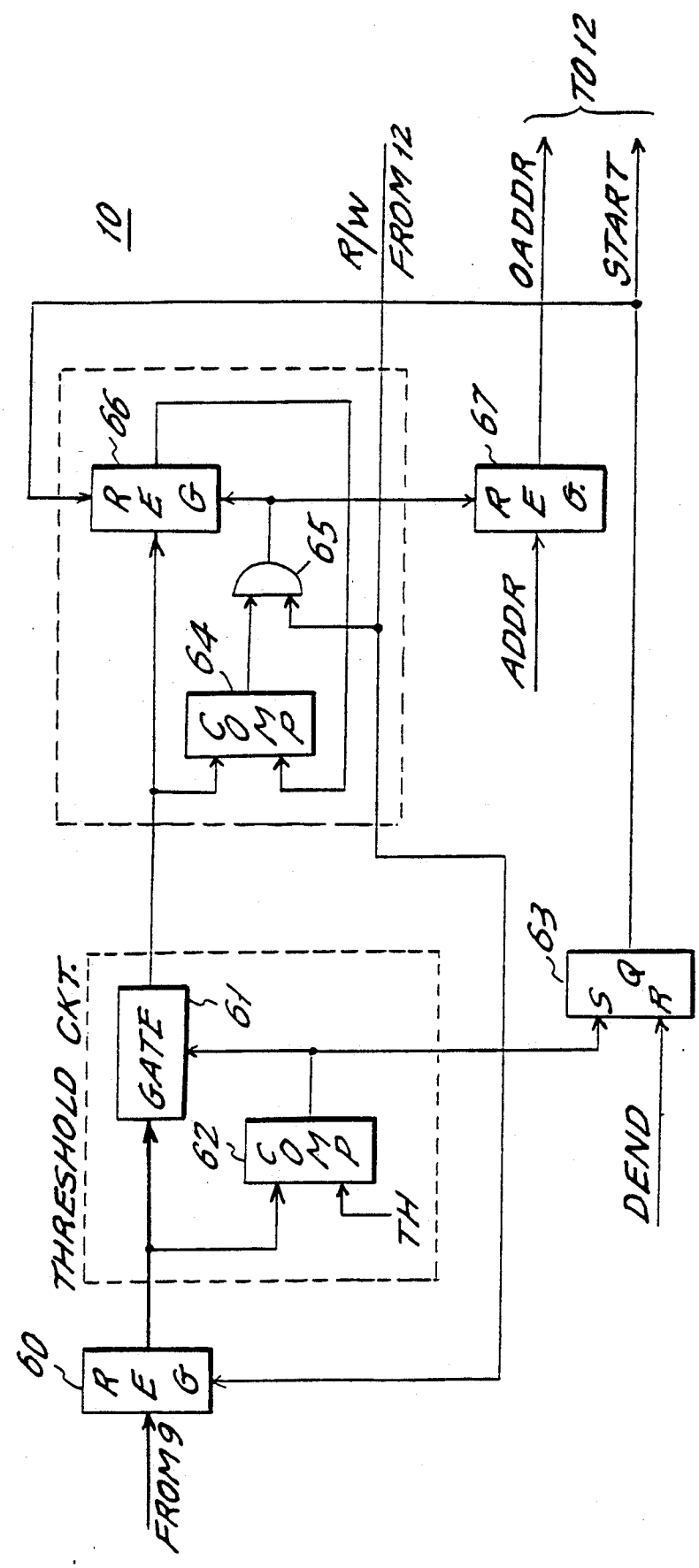
FIG. 6 is a block diagram illustrating the configuration of an unmodulated carrier detecting circuit.

Next will be described the configuration of the unmodulated carrier detecting circuit 10 with reference to FIG. 6. The unmodulated carrier detecting circuit 10 is provided with a register 60 for sampling the calculated value supplied from the squaring circuit 9 with the aforementioned control signal R/W; a threshold circuit comprising a gate 61 and a comparator 62; a maximum value detecting circuit consisting of a comparator 64, an AND gate 65 and a register 66; a register 67 for holding the address corresponding to the maximum value detected by the maximum value detecting circuit; and a set/reset flip-flop 63 reset by the control signal DEND supplied from outside this embodiment and set by the output of the comparator 62.

When the control signal DEND shown in FIG. 2E rises to the high level, i.e. when the receive data processing circuit arranged downstream in this embodiment completes the reception of all the data, the set/reset flip-flop 63 is reset. The output of this set/reset flip-flop 63 is sent to the control circuit 12 as the aforementioned control signal START. The control circuit 12 can know the timing at which the conventional PLL operation currently under way is to be ended and a shift to time division PLL operation should take place by detecting the high to low transition of this control signal START from the high to the low level. As will be described later, the set/reset flipflop 63 is set by the output of the comparator 62 at the timing of the leading part of the carrier recovery section of the receive burst. At this time, the control signal START undergoes transition from the low to the high level, and the control circuit 12 can know from this transition that the time division PLL operation currently under way is to be ended in M more clock times. This control signal START is also supplied to the clear terminal of the register 66, which is cleared while the control signal START is at the low level, i.e. after the completion of burst reception until the entry of the leading part of the carrier recovery section of the next burst.

The value supplied from the squaring circuit 9, i.e. the calculated value indicating the recovered carrier frequency component of the receive burst (or the oscillating frequency component of the digital VCO 5) is sampled by the register 60 with the control signal R/W, and fed to the gate 61 and the comparator 62.

The comparator 62 compares the calculated value supplied from the register 60 with a fixed threshold (TH). If the calculated value is greater than the threshold, the comparator 62 will output a high level, or if not, a low level. The gate 61 lets the entered calculated value as it is when the output of the comparator 62 is at the high level or, when it is not, supplies a value 0 to the first input of the comparator 64.

The output of the comparator 62 is also supplied to the set terminal of the set/reset flipflop 63, which is set when the output of the comparator 62 is at the high level. Here, the time when the output of the comparator 62 rises to the high level for the first time is at the leading part of the carrier recovery section of the receive burst, because it is only when the carrier recovery section is entered that the output of the squaring circuit 9 can surpass the threshold (TH). In other words, the threshold (TH) is so set that the square sum may not surpass it in any other part of the receive burst or when no burst has been received yet. If, however, too great a value is given to this threshold, it will become impossible to detect the carrier recovery section. Therefore, it is so selected as to equalize the probability of the square to be below the threshold in the carrier recovery section and its probability to surpass the threshold in other periods.

The operations of the maximum value detecting circuit consisting of the comparator 64, AND gate 65 and register 66 and of the register 67 are described below. In the register 66 is stored the greatest among the values entered in the past into the maximum value detecting circuit from the gate 61. The comparator 64 compares the output of the gate 61 and that of the register 66. If the output of the gate 61 is found greater, the output of the comparator 64 will rise to the high level or, if not, fall to the low level. The output of this comparator 64 is supplied to the first input terminal of the AND gate 65.

Figure 4B:
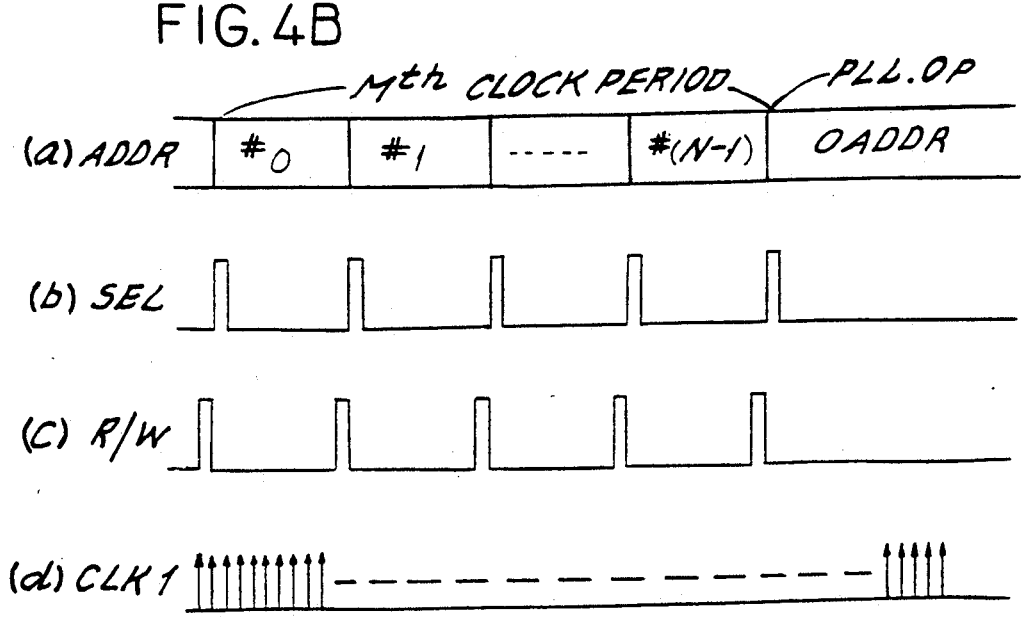
FIG. 4B is a timing chart for describing the operation of the circuit of FIG. 4A.

The second input terminal of the AND gate 65 is supplied with the control signal R/W (see FIG. 4B(c)) from the control circuit 12. Whereas this control signal R/W, as stated above, rises to the high level only at the final operational clock time of each subperiod, the unmodulated carrier detecting circuit 10 generates with the AND gate 65 timing signals for operating the registers 66 and 67 on the basis of the control signal R/W. The AND gate 65 lets the control signal R/W pass as it is when the output of the comparator 64 is at the high level. When it is not, the output of the AND gate 65 is at the low level. Thus, timing signals are supplied to the registers 66 and 67 only when the output of the gate 61 is greater than the former maximum value stored in the register 66. Only when its timing signal is supplied, the maximum value of the register 66 is updated to the output value of the gate 61.

Meanwhile, the input of the register 67 is supplied with the address signal ADDR indicating the subperiod corresponding to the calculated value supplied from the squaring circuit 9, and this address signal ADDR is stored in the register 67 in response to the timing signal from the AND gate 65. In this way, the address (OADDR) indicating the subperiod whose calculated value has become the greatest is held in the register 64. This address OADDR is read out by the control circuit 12 at the ending time of the tiem division PLL operation period.

Figure 7:
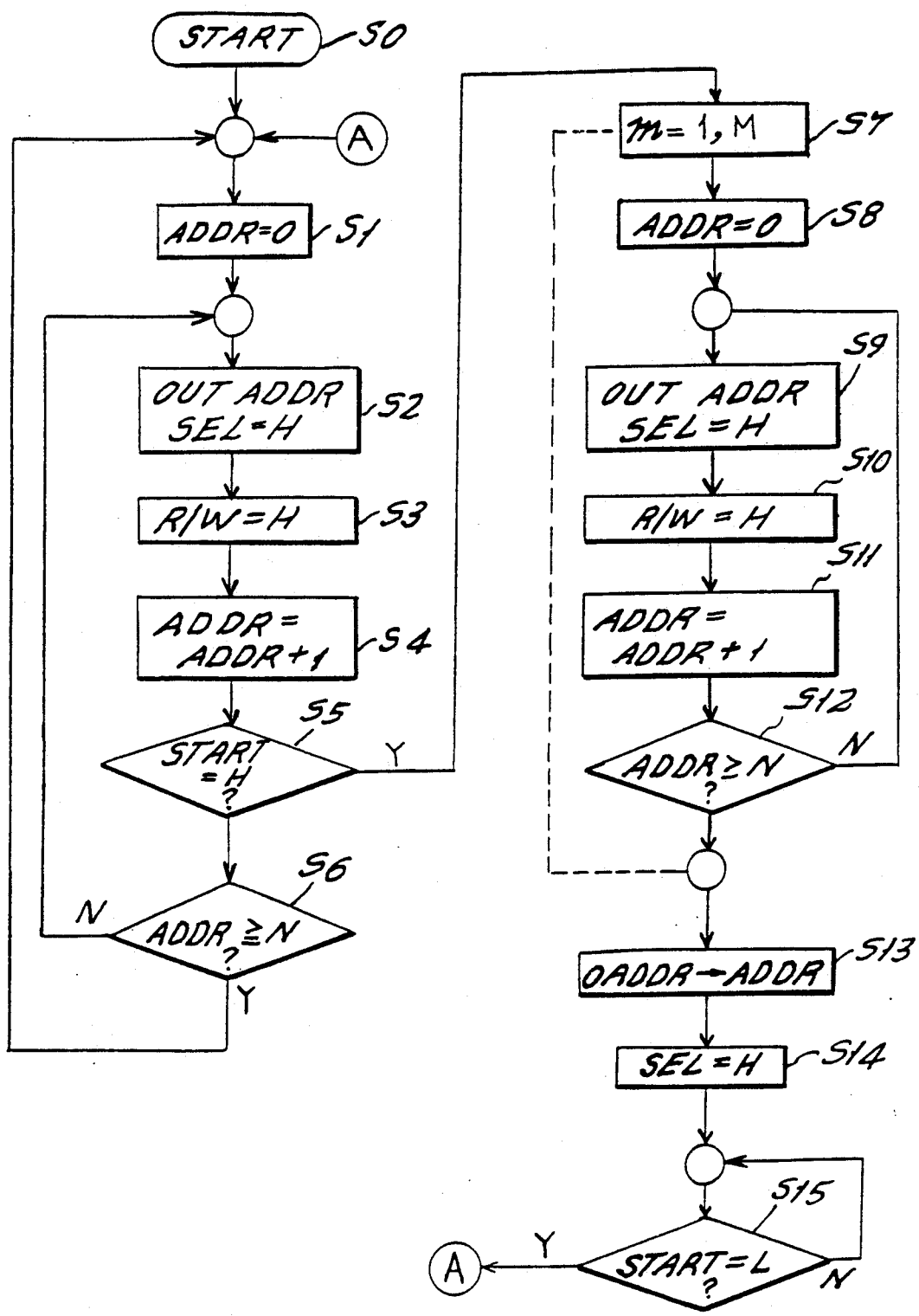
FIG. 7 is a flow chart for describing the operation of the control circuit.

Next will be described the control circuit 12, which consists of a microprocessor or the like. FIG. 7 is a flow chart showing the program to be stored in the microprocessor. The operation of the control circuit 12 will be described below with reference to this flow chart.

When the power supply to the apparatus is turned on, the operation of the control circuit begins with time division PLL operation before any burst has been received, as shown in steps S1 through S6. The operation from step S1 through step S6 is repeated until the detection at step S5 of the transition of the control signal START from the unmodulated carrier detecting circuit 10 from the low to the high level.

First at step S1, the control signal ADDR is set to 0. Then at step S2, the control signal ADDR is supplied to the memories 6 and 7, unmodulated carrier detecting circuit 10 and offset generator 11 of FIG. 1. The processing at this step S2, as stated above, takes place at the first operational clock time of each of the subperiods #0 through #(N−1). At step S2, the control signal SEL is raised to the high level, and supplied to the memories 6 and 7, and the internal values of the digital VCO 5 and the low-pass filter 8 at the final operational clock time of the same subperiod in the preceding data clock cycle, stored in these memories, are caused to be stored into register-equipped multiplexers, in which are stored internal values, in the digital VCO 5 and the low-pass filter 8. Upon completion of this processing, the control signal SEL again falls to the low level.

Then, at the final operational clock time of each subperiod, the control signal R/W is raised to the high level at step S3, and the internal values of the digital VCO 5 and the low-pass filter 8 are stored into the memories 6 and 7. Upon completion of this processing, the control signal R/W is again set to the low level. At step S4, the value of the control signal ADDR is increased by 1.

At step S5, upon detection of the transition of the control signal START from the unmodulated carrier detecting circuit 10 from the low to the high level, the operation from step S1 through step S6 is ended, followed by shifting to the processing of step S7 and thereafter. If this transition of the control signal START is not detected, the control moves on to step S6, and it is judged whether or the ADDR is N or above. If it is, the control will return to step S1, and the processing of one clock period will be completed. If not, it will return to step S2. In this way, if the transition of the control signal START from the low to the high level is not detected, the processings from step S1 through S6 will be repeated.

Meanwhile, if the transition of the control START from the low to the high level is detected at step S5, time division PLL operation from step S7 through step S12 will take place. The processings at steps S8, S9, S10, S11 and S12 are the same as those at steps S1, S2, S3, S4 and S6, respectively. By repeating the processings from step S8 through step S12 M times, control signals required from time division PLL operation from the first through Mth clock periods in FIG. 2 are generated.

Upon completion of the processings from step S7 through step S12, there will take place shifting to conventional PLL operation. First at step 13, the address (OADDR) indicating the optimum subperiod, supplied from the unmodulated carrier detecting circuit 10, is directly outputted as the control signal ADDR. Then at step S14, the control signal SEL is raised to the high level at only one operational clock time, and the internal values of the digital VCO 5 and the low-pass filter 8 at the final operational clock time of the optimum subperiod in the Mth clock period are transferred to the register-equipped multiplexers in the digital VCO 5 and the low-pass filter 8. In this way, the control circuit 12 moves on to the control of conventional PLL operation in FIG. 2. This conventional PLL operation continues until the transition of the control signal START from the unmodulated carrier detecting circuit 10 from the high to the low level takes place at step S15, i.e. until the set/reset flipflop 63 in the unmodulated carrier detecting circuit 10 is reset.

Upon detection of the transition of the control signal START to the low level at step 15, i.e. upon completion of the demodulation of the data section of the receive burst, the control circuit 12 will return to the processings from step S1 through step S6.

What is claimed is:

1. An apparatus for carrier acquisition, from receive burst signals in a digital satellite communication system, comprising:
    demodulating means for demodulating said receive burst signals on the basis of a reference carrier and supplying demodulated signals;
    phase difference detecting means for detecting a phase difference between a carrier component of said receive burst signals and said reference carrier on the basis of said demodulated signals, and supplying a phase difference signal;
    first filtering means for filtering said phase difference signal from said phase difference detecting means, and supplying a phase control signal;
    frequency control signal generating means for generating a frequency control signal on the basis of a first control signal;
    reference carrier generating means for generating said reference carrier on the basis of said phase control signal and said frequency control signal, said reference carrier generating means having built-in memory means for storing a control value of said phase control signal and said signal frequency control signal, said control value being stored at an address defined by said first control signal;
    second filtering means for filtering said demodulated signals, and supplying filtered demodulated signals;
    D.C. value calculating means for calculating a D.C. value contained in said filtered demodulated signals;
    unmodulated carrier component detecting means for detecting the greatest value of said D.C. value calculated by said D.C. value calculating means; and
    control means for circulatively controlling said first control signal to change said frequency control signal in part of the period of a carrier recovery section of said burst and when no burst has been received yet, and for supplying an optimal control signal of said first control signal associated with said greatest value of said D.C. value, wherein said digital satellite communication system operates by a reference carrier generated by said reference carrier generating means in accordance with said optimal control signal.

2. An apparatus for carrier acquisition, from receive burst signals in a digital communication system as claimed in claim 1, wherein said second filtering means is further provided with a memory into which an internal value of the second filtering means is stored immediately before said first control signal changes at the address indicated by said first control signal, and said memory sets, immediately after said first control signal changes, the value stored at the address indicated by said first control signal as the internal value of said second filtering means.

3. An apparatus for carrier acquisition, from receive burst signals in a digital communication system as claimed in claim 1, wherein said unmodulated carrier detecting means is further provided with means for detecting the arrival of a burst on the basis of said D.C. value and supplying a burst arrival detection signal, and bistable value output means, which is set in one state by this burst arrival detection signal and set in the other state by a signal indicating the completion of the demodulation of data in the burst, for supplying a second control signal according to which said control means judges which of three periods the current time belongs, the three periods including a period in which said burst has not yet been received, part of the period of the carrier recovery section of said burst, and the period from the remaining part of the carrier recovery section of said burst until the completion of burst reception.

4. An apparatus for carrier acquisition as claimed in claim 1, wherein said built-in memory means of said reference carrier generating means stores its internal values at the address indicated by the first control signal immediately before said first control signal varies and, immediately after said first control signal varies, sets the value stored at the address indicated by the first control signal to the internal values of the reference carrier generating means.

* * * * *